US012623939B2

(12) United States Patent
Ekholm et al.

(10) Patent No.: US 12,623,939 B2
(45) Date of Patent: May 12, 2026

(54) BIOFILTER WITH SHAPED UNDERDRAIN ASSEMBLY

(71) Applicant: Aqseptence Group, Inc., New Brighton, MN (US)

(72) Inventors: Michael R. Ekholm, Minneapolis, MN (US); Elsa Vulliez, Châtellerault (FR); Clement Vitteau, Availles en Châtellerault (FR); Fabrice Coura-Geot, Availles en Châtellerault (FR)

(73) Assignee: JOHNSON SCREENS, INC., New Brighton, MN (US)

( * ) Notice: Subject to any disclaimer, the term of this patent is extended or adjusted under 35 U.S.C. 154(b) by 240 days.

(21) Appl. No.: 18/019,817

(22) PCT Filed: Aug. 5, 2021

(86) PCT No.: PCT/US2021/044839
§ 371 (c)(1),
(2) Date: Feb. 5, 2023

(87) PCT Pub. No.: WO2022/032027
PCT Pub. Date: Feb. 10, 2022

(65) Prior Publication Data
US 2023/0303414 A1 Sep. 28, 2023

Related U.S. Application Data

(60) Provisional application No. 63/061,771, filed on Aug. 5, 2020.

(51) Int. Cl.
C02F 3/06 (2023.01)

(52) U.S. Cl.
CPC .......... C02F 3/06 (2013.01); C02F 2203/006 (2013.01)

(58) Field of Classification Search
CPC .... B01D 24/24; B01D 24/4631; B01D 24/22; C02F 3/06
(Continued)

(56) References Cited

U.S. PATENT DOCUMENTS

| 4,323,367 A | * | 4/1982 | Ghosh | ...................... B09B 1/00 |
| | | | | 405/129.95 |
| 5,156,738 A | | 10/1992 | Maxson | |

(Continued)

FOREIGN PATENT DOCUMENTS

| EP | 2532404 A1 | 12/2012 |
| JP | H0796294 | 4/1995 |

(Continued)

OTHER PUBLICATIONS

Nagafuji et al, JP 2014166611 A, English machine translation, pp. 1-12 (Year: 2014).*

(Continued)

*Primary Examiner* — Claire A Norris
(74) *Attorney, Agent, or Firm* — Husch Blackwell

(57) ABSTRACT

An improved biofilter design and related methods of utilizing shaped drain assemblies for directing fluid flow though a biofilter media to promote biological interaction. A shaped drain assembly can include a plurality of elongated drain structures having a permeable upper surface, a. lower surface and a drain interior defining a drain cross-section. When configured as a shaped underdrain assembly, each elongated drain structures can be in proximity to a biofilter tank floor such that the lower surface is in fluid communication with one or more flow channels below the floor and with the permeable upper surface supporting the biofilter media. The biofilter can include a shaped drain assembly positioned above the shaped underdrain assembly and located within or above the biofilter media. The shaped drain assemblies can (Continued)

control the flow and mixing of two or more flow species into the biofilter media.

22 Claims, 26 Drawing Sheets

(58) Field of Classification Search
  USPC ........................................ 210/615, 293, 275
  See application file for complete search history.

(56)                    References Cited

U.S. PATENT DOCUMENTS

| | | | |
|---|---|---|---|
| 5,989,416 A | 11/1999 | Gorton | |
| 8,491,787 B2 | 7/2013 | Wolf et al. | |
| 2003/0047502 A1 | 3/2003 | Roberts et al. | |
| 2005/0194302 A1 | 9/2005 | Roberts et al. | |
| 2008/0121580 A1 * | 5/2008 | Ekholm ............. | B01D 24/4631 210/293 |
| 2009/0091057 A1 | 4/2009 | Keys, Sr. et al. | |
| 2009/0294356 A1 | 12/2009 | Beggs | |
| 2012/0091057 A1 | 4/2012 | Kent et al. | |
| 2014/0216690 A1 * | 8/2014 | Headley ............. | F28D 21/0015 165/104.19 |
| 2015/0376889 A1 * | 12/2015 | Ekholm ............. | B01D 24/4631 210/163 |

FOREIGN PATENT DOCUMENTS

| | | | |
|---|---|---|---|
| JP | H11216306 | | 8/1999 |
| JP | 2014166611 | | 9/2014 |
| JP | 2014166611 A | * | 9/2014 |
| KR | 100859416 | | 9/2008 |
| WO | 2014/127226 | | 8/2014 |
| WO | 2020/206437 | | 10/2020 |

OTHER PUBLICATIONS

PCT International Search Report and PCT Written Opinion of the ISA for PCT/US2021/044839, mailed Nov. 16, 2021, 7 pages.
Extended European Search Report for EP Application No. 21853417, dated Dec. 20, 2023, 9 pgs.

* cited by examiner

DUAL FLOW WITH LOW
FLOW OF SPECIES 2 INTERNAL
FLOW CONTROL ALLOWS FOR GOOD
DISTRIBUTION AT LOWER FLOWS

DUAL FLOW WITH HIGH
FLOW OF SPECIES 2 INTERNAL
FLOW CONTROL ALLOWS FOR
GOOD DISTRIBUTION AT HIGHER FLOWS

STRATIFIED FLOW CONTROL DESIGN
ALLOWS FOR MULTIPLE SPECIES TO BE
CONTROLLED AT MULTIPLE LEVELS

BIOFILTER WITH SHAPED UNDERDRAIN ASSEMBLY

PRIORITY CLAIM

The present application is a National Phase Entry of PCT Application No. PCT/US2021/044839, filed on Aug. 5, 2021, which claims prior to U.S. Provisional Application Ser. No. 63/061,771 filed Aug. 5, 2020 and entitled, "BIOFILTER WITH SHAPED UNDERDRAIN ASSEMBLY", all of which are hereby incorporated by reference in their entirety.

FIELD OF THE INVENTION

The present disclosure relates generally to biofilter systems for biological filtration of liquid streams. More specifically, the present disclosure is directed to an improved biofilter system utilizing shaped underdrain assemblies to improve flow distribution, simplify construction and reduce maintenance.

BACKGROUND

As opposed to liquid filtration systems that remove contaminant from liquid sources based upon size, conventional biofilter systems utilize a high surface area treatment media that promotes biological growth on the media surface to break down organic contaminants. Typically, biofilter systems utilize aeration to provide oxygen and nitrogen to promote the growth of bacteria on the surface of the treatment media. Depending upon the organic contamination within the liquid source, flow performance within the biofilter system is very important as even distribution and full utilization of treatment media is necessary to ensure a satisfactory residence time within the biofilter has been achieved.

Biofilters generally utilize an underdrain support system at the bottom of a holding tank to support the treatment media. Conventional support systems typically comprise a network of pipes, nozzles and valves mounted within channels in the floor of the holding tank. These support systems can include structures for the distribution and collection of both air and liquid flow streams. Conventional support systems can be expensive and time consuming to install as well as being difficult to service and maintain. As such, it would be advantageous to improve upon current biofilter design through the use of an improved underdrain support system.

SUMMARY

In representative embodiments of the present disclosure, there is provided an improved biofilter design utilizing shaped drain assemblies to support a treatment media and to promote air and liquid flow through the treatment media.

In representative embodiments of the present disclosure, there is provided an improved biofilter design utilizing shaped drain assemblies to support a treatment media and to promote air and liquid flow through the treatment media. In some embodiments, the shaped drain assemblies are arranged as underdrain assemblies arranged on or in proximity to a floor of a biofilter tank such that the underdrain assembly supports a biofilter media bed. In some embodiments, the shaped drain assembly can be arranged above the floor of the biotank filter and either within or above the biofilter media bed. In some embodiments, the shaped drain assemblies can comprise multiple drains assemblies, for example, a shaped underdrain assembly on the floor of the biotank filter and another shaped drain assembly positioned above the underdrain assembly and either within or above the biofilter media bed. Regardless of orientation in the biofilter tank, the shaped drain assembly can comprise a plurality of elongated drain structures having a permeable upper surface, a lower surface and a drain interior defining a drain cross-section. Each elongated drain structure can comprise one or more fluid connections including flow controls such as flow orifices and flow valves to control flow one or more fluid streams, liquid or gas, into the drain interior where the one or more fluid streams can be directed through the permeable upper surface and in some embodiments, induce mixing of multiple fluid streams within the drain interior. In some embodiments, each elongated drain structure includes a flow interface within the drain interior to control flow of two or more fluid species through the permeable upper surface.

In one aspect, the present invention is directed to a biofilter system utilizing a shaped underdrain support system. An embodiment of the biofilter system can comprise a biofilter tank, a biofilter media and a shaped underdrain assembly. The biofilter tank can have a tank floor with one or more flow channels defined below a floor surface. The shaped underdrain assembly includes a plurality of elongated underdrain structures, wherein each elongated underdrain structure comprises a permeable upper surface, a lower surface and an underdrain interior defining an underdrain cross-section. Each elongated underdrain structure can be positioned across one or more of the flow channels such that the lower surface is in fluid communication with the one or more flow channels. The elongated underdrain structures can be fabricated such that the underdrain cross-section has desirable properties including, for example, fluid flow properties through the permeable upper surface and mechanical strength to support the blot her media bed on the permeable upper surface. Representative underdrain cross-sections can include sectional shapes selected from, for example, hemispherical, semi-spherical, triangular, hexagonal, quadrilaterals such as squares and rectangles and the like. The permeable upper surface can comprise a slotted screen, for example, a Vee-Wire® screen formed by attached shaped wire in spaced apart, parallel arrangement on support rods. Each elongated support structure can include on or more fluid connections for allowing one or more fluid flows, either gas or liquid flows, into the underdrain interior. In some embodiments, a flow interface can be mounted within the undrain interior to control the flow of two or more flow species through the permeable upper surface. In some embodiments, the biofilter system can comprise a shaped upper drain assembly positioned above the shaped underdrain assembly such the shaped upper drain assembly is located within or above the biofilter media bed. With the exception of mounting location within the biofilter tank, the shaped upper drain assembly, can comprise similar structure as the shaped underdrain assembly such that fluid flows can be managed in both upward and downward directions through the biofilter media bed and to facilitate biological interaction with the biofilter media bed.

In yet another aspect, the present invention is direct to a method of promoting biological treatment in a biofilter. The method can comprise positioning a shaped underdrain assembly on a floor of biofilter tank. The shaped underdrain assembly can comprise a plurality of elongated underdrain structures, each elongated underdrain structure having a permeable upper surface, a lower surface and an underdrain interior defining an underdrain cross-section. Each elongated underdrain structure is positioned to be in fluid communication with one or more flow channels located below the floor of the biofilter tank. The method can further comprise supporting a biofilter media bed on the permeable upper surface and directing fluid flow in one or more directions through the permeable upper surface to promote biological interaction in the biofilter media bed. In some embodiments, the step of directing fluid flow can comprise directing at least a first and second fluid flow species through the permeable upper surface in either the same or opposed directions. In some embodiments, the step of directing fluid flow can comprise missing two or more fluid flow species in the underdrain interior prior to introducing fluid flow into the biofilter media bed. The method can further comprise positioning a shaped drain assembly similar in structure the shaped underdrain assembly in a location above the shaped underdrain assembly, for example, within or above the biofilter media bed.

The above summary is not intended to describe each illustrated embodiment or every implementation of the subject matter hereof. The figures and the detailed description that follow more particularly exemplify various embodiments.

BRIEF DESCRIPTION OF THE FIGURES

Subject matter hereof may be more completely understood in consideration of the following detailed description of various embodiments in connection with the accompanying figures, in which.

Figure 1A:
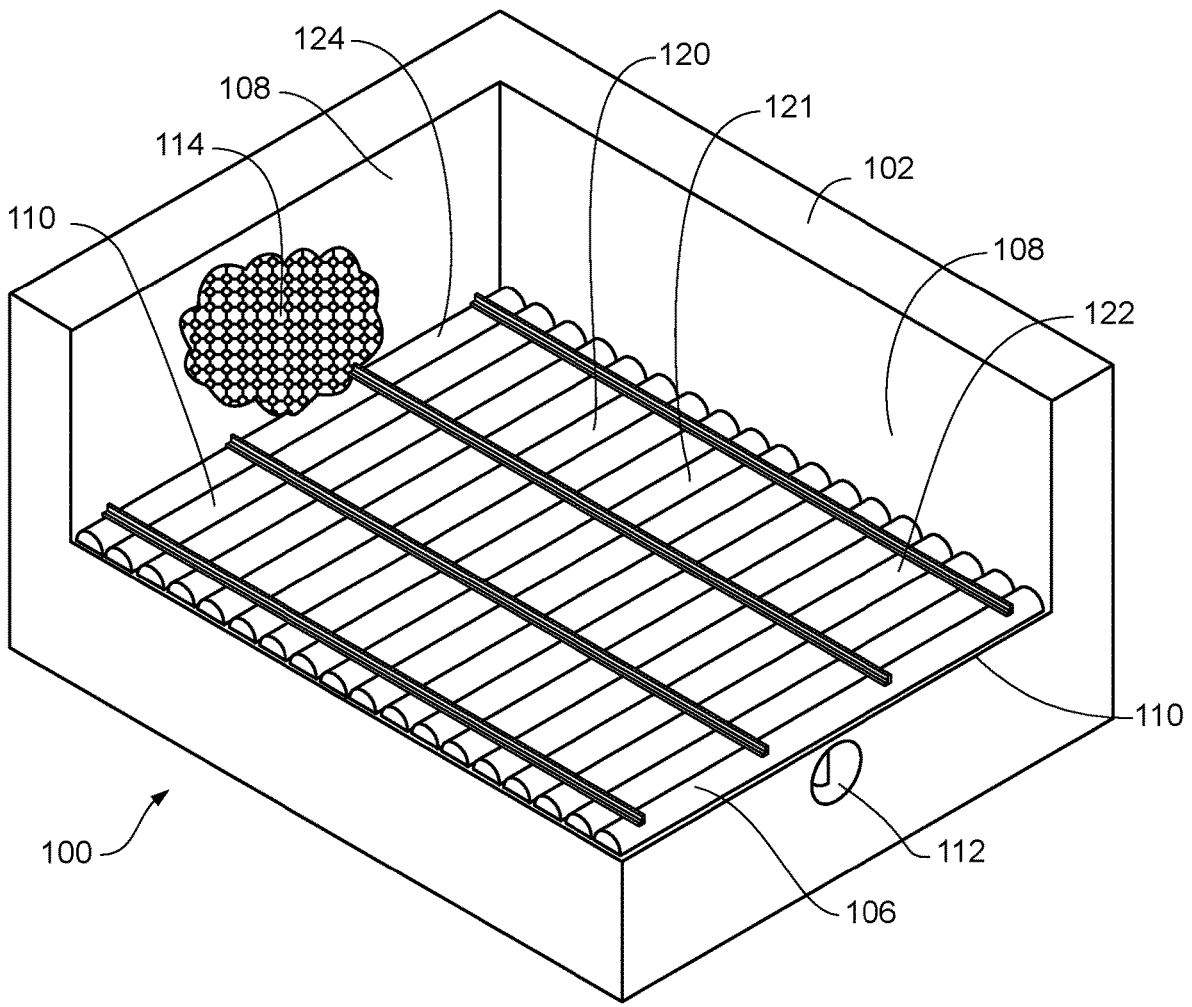
FIG. 1A is a partially hidden, perspective view of a biofilter system according to an embodiment of the present invention.
Figure 1B:
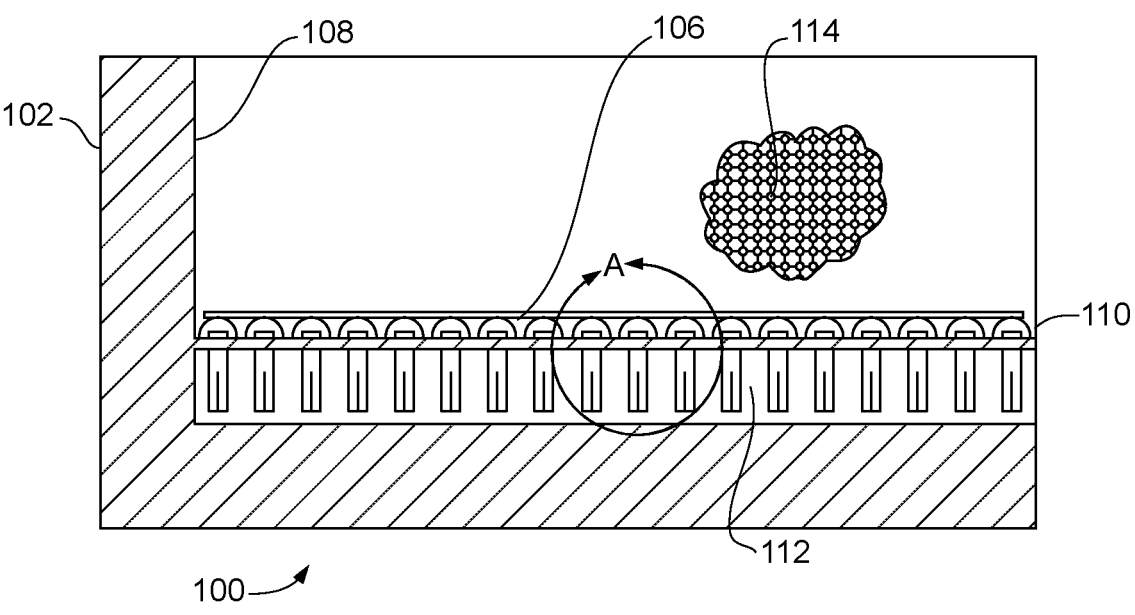
FIG. 1B is a partial section view of the biofilter system of FIG. 1A.
Figure 1C:
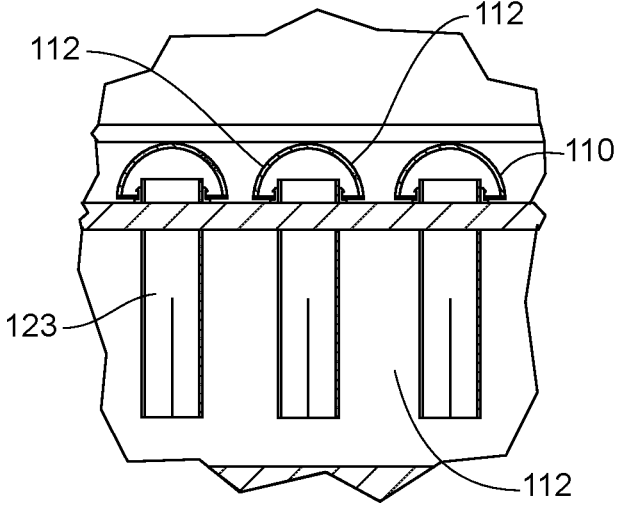
FIG. 1C is an enlarged section view taken at Detail A of FIG. 1B.
Figure 2:
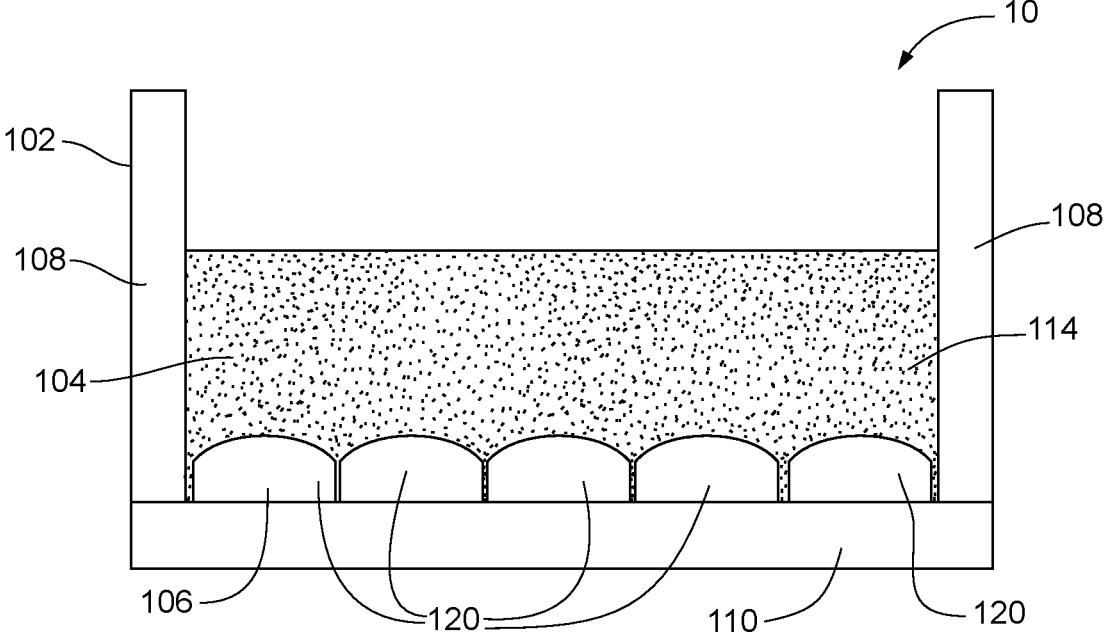
FIG. 2 is a section view of the biofilter system of FIG. 1.
Figure 3:
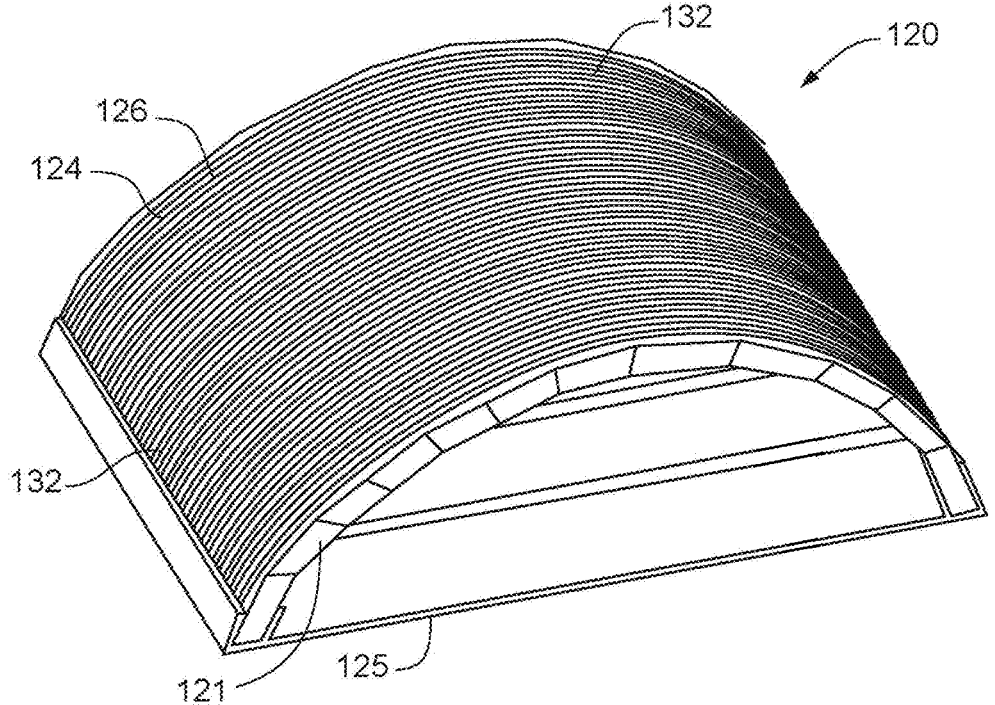
FIG. 3 is a perspective, end view of a shaped underdrain according to an embodiment of the present invention.
Figure 3A:
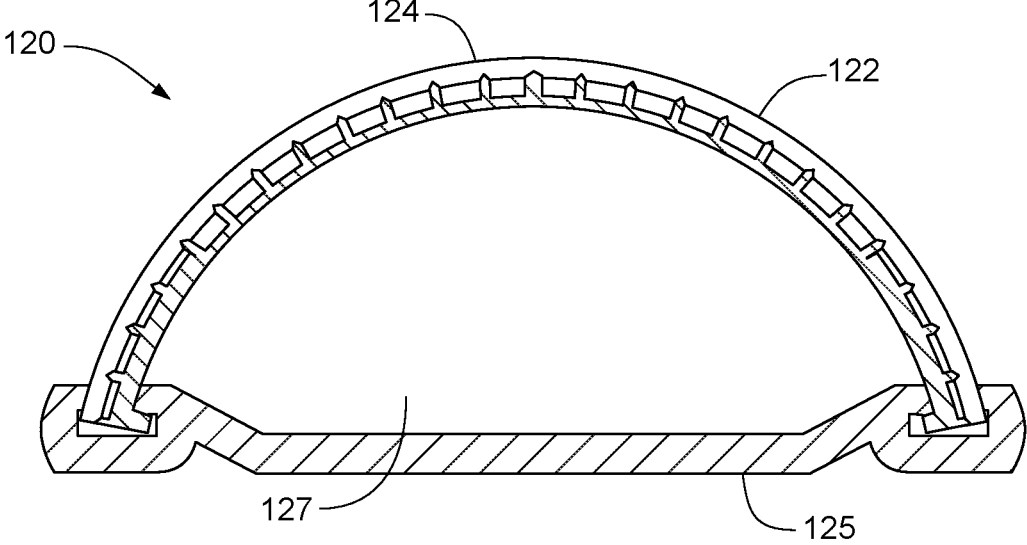
FIG. 3A is an end view of the shaped underdrain of FIG. 3.
Figure 4:
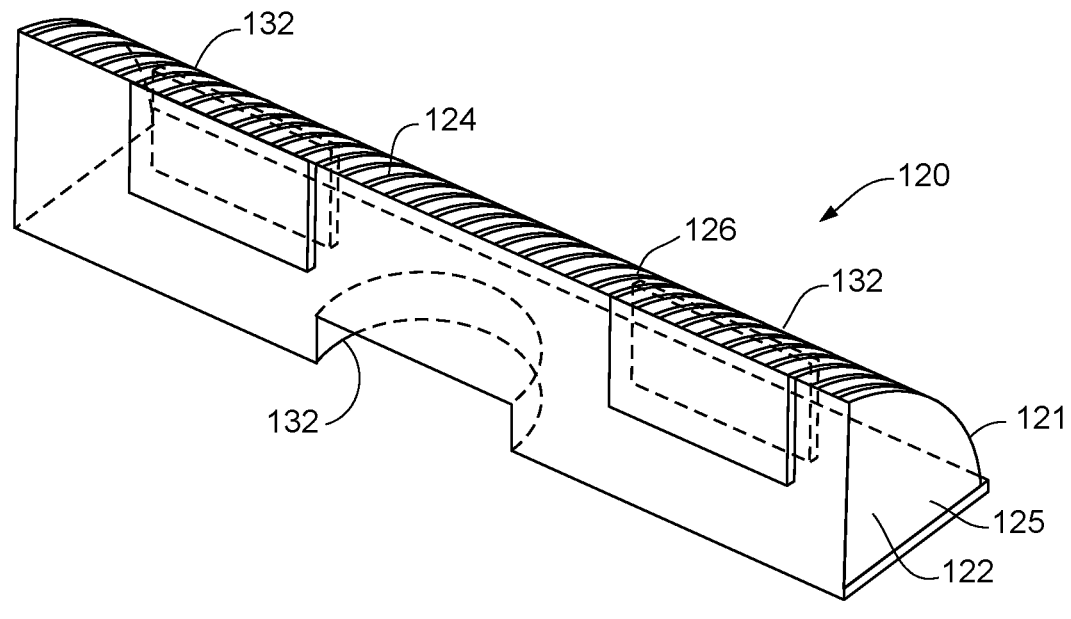
FIG. 4 is a perspective, section view of the shaped underdrain of FIG. 3.
Figure 5:
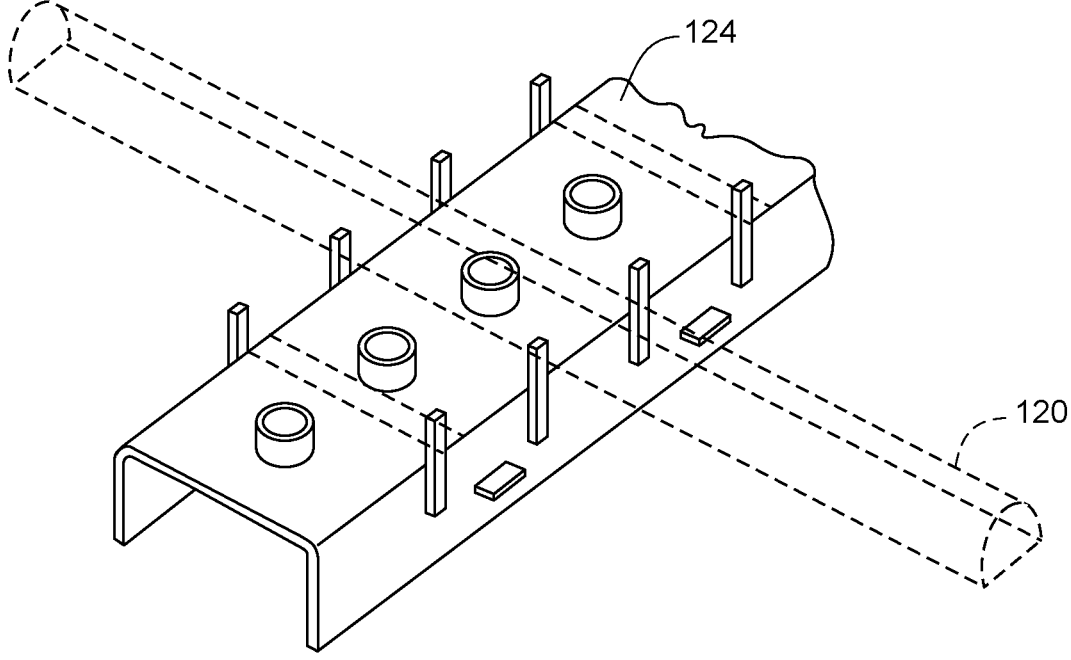
FIG. 5 is a perspective view of a flume plate according to an embodiment of the present invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE FIGURES

Referring to FIGS. 1A, 1B, 1C and 2, a representative biofilter system 100 of the present invention can comprise a tank 102, a media bed 104 and a shaped underdrain assembly 106. Tank 102 can be a wide variety of sizes including smaller sizes appropriate for portable system as well as larger sizes for municipal or large process applications. Generally, tank 102 comprises a plurality of walls 108 and a floor 110. Floor 110 generally defines one or more channels 112. Media bed 104 generally comprises a treatment media 114 that is selected to promote biological growth. Treatment media 114 is generally selected to have a high surface area so as to encourage bacteria to interact with organic elements within an influent stream. Representative treatment media 114 can comprise granular media, floating media and/or structural fill. Representative examples of granular media include activated carbon, Biolite, Filtralite and sand. Representative examples of floating media include polystyrene and/or polyethylene beads. Typically, the size of the tank 102 and the depth of media bed 104 are selected to provide a desired residence time for the necessary biological interaction to occur.

Figure 6:
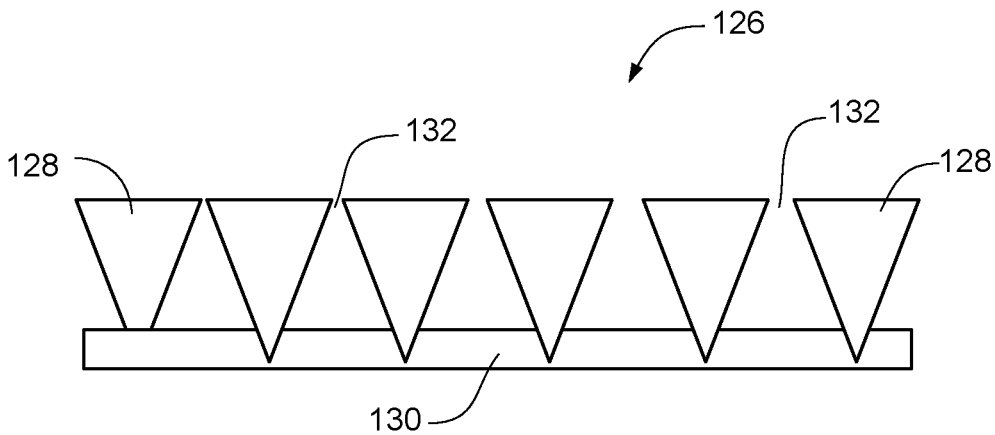
FIG. 6 is a side view of a slotted screen according to an embodiment of the present invention.
Figure 7A:
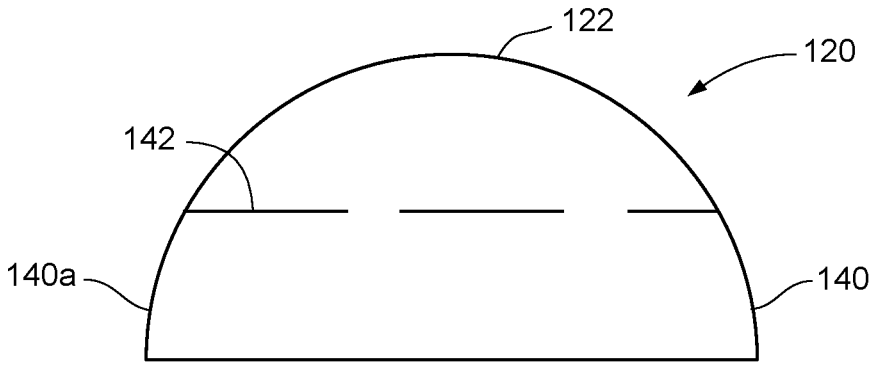
FIG. 7A is a section view of a shaped underdrain according to an embodiment of the present invention.
Figure 7B:
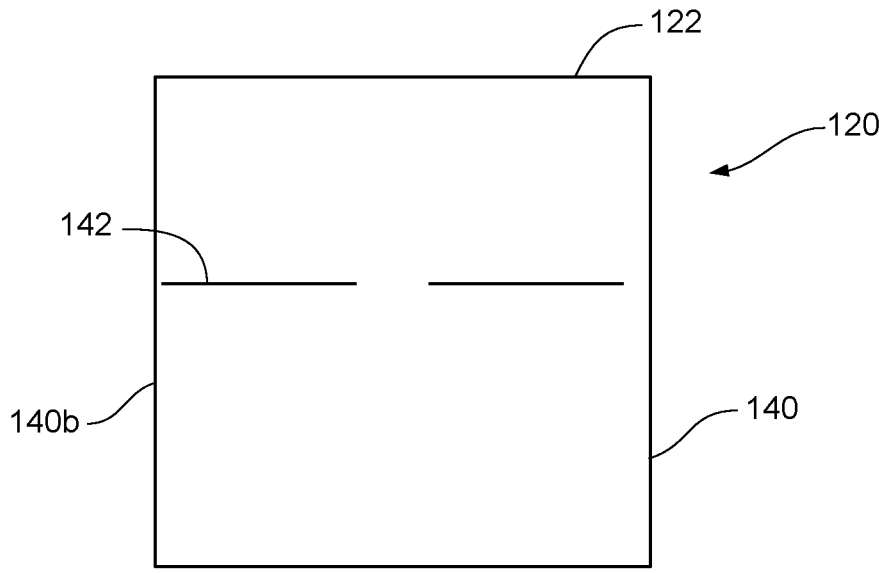
FIG. 7B is a section view of a shaped underdrain according to an embodiment of the present invention.
Figure 7C:
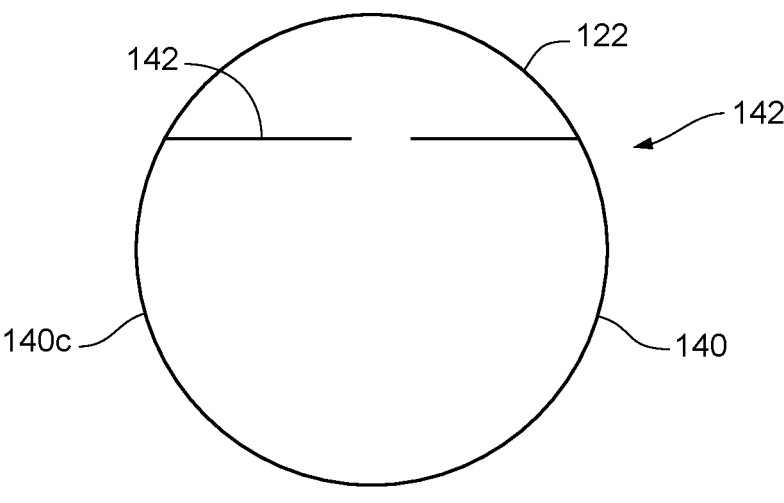
FIG. 7C is a section view of a shaped underdrain according to an embodiment of the present invention.
Figure 7D:
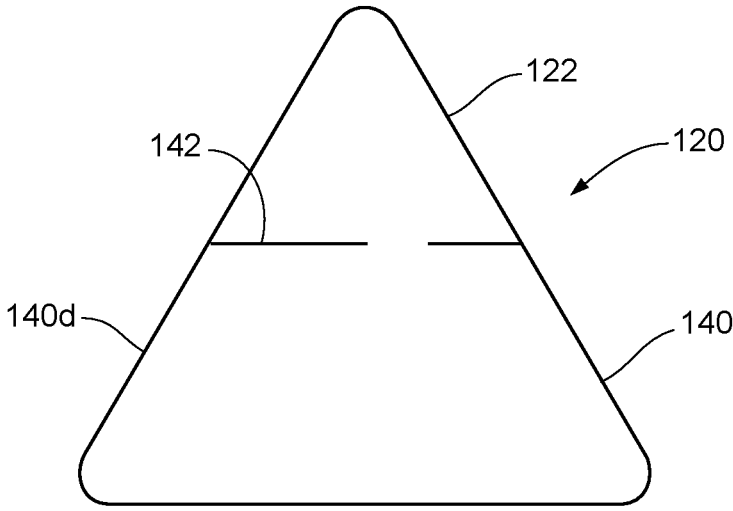
FIG. 7D is a section view of a shaped underdrain according to an embodiment of the present invention.
Figure 7E:
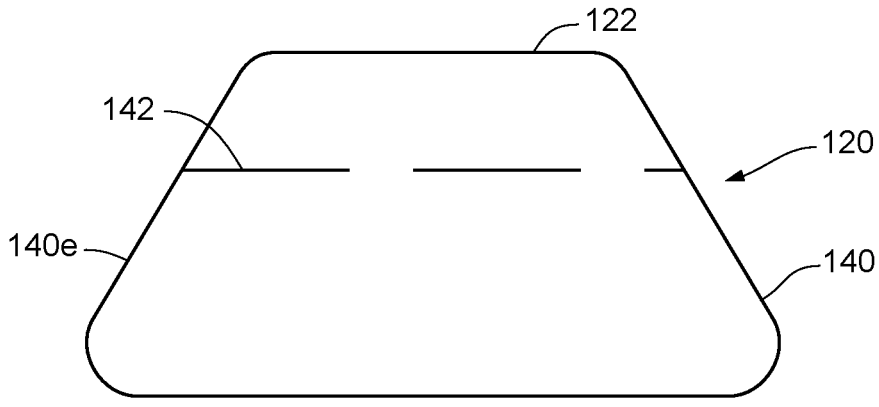
FIG. 7E is a section view of a shaped underdrain according to an embodiment of the present invention.
Figure 7F:
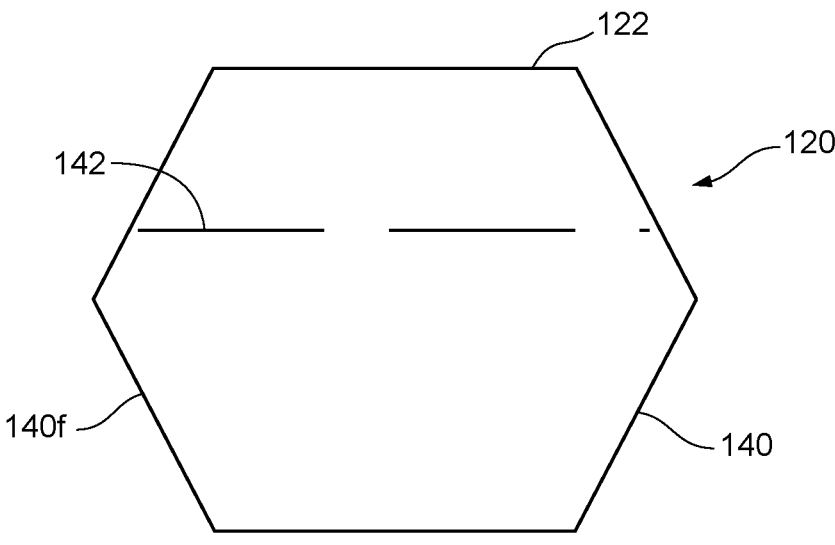
FIG. 7F is a section view of a shaped underdrain according to an embodiment of the present invention.

Referring now to FIGS. 3, 3A, 4 and 5, shaped underdrain assembly 106 generally comprises a plurality of individual shaped underdrains 120 that define elongated structures 121 that are each fluidly connected to a corresponding channel 112 within or below floor 110 such that the shaped underdrains 120 extend across the tank 102. Generally, each shaped underdrain 120 can comprise an upper drain portion 122 that sits above the floor 110. In some embodiments, a lower drain portion or flume plate 123 can physically reside within the channel 112. Upper drain portion 122 generally includes a fluid permeable upper support surface 124 that is in contact with and supports the media bed 104 and a lower support floor or surface 125, wherein a drain interior 127 is defined between the permeable upper support surface 124 and the lower support floor 125. In one presently preferred embodiment, permeable upper support surface 124 can comprise a slotted screen 126 formed by mounting shaped-wire elements 128 to support members 130 such that adjacent shaped-wire elements reside in parallel arrangement and define slots 132 there between as shown in FIG. 6. Representative examples of shaped-wire elements 128 can comprise wedge or Vee-Wire® elements having a vee-shaped or triangular cross-section 130. Support floor 125 generally comprises a plurality of spaced apart floor apertures 132 that can be fluidly connected to the flume plate 123. Shaped underdrains 120 can be constructed and fabricated similar to those disclosed in US Patent Publication 2019/0218764, the content of which is hereby incorporated by reference in its entirety. Depending upon the process characteristics, shaped underdrains 120 and the various components making up the shaped underdrains 120 can be metallic materials such as, for example, stainless steel and copper alloys, polymeric materials such as, for example, polyvinyl chloride, and combinations of metallic and polymeric materials thereof. In addition, it may be advantage to utilize surface coatings or treatments on the upper support surface, for example, copper coatings that seek to prevent or reduce biological growth on the upper support surface 124 so as to reduce fouling of the slotted screen 126 that would require frequent maintenance and/or increased backwash cycles.

Referring now to FIGS. 7A, 7B, 7C, 7D, 7E and 7F, upper drain portion 122 can generally define a cross-sectional shape 140 that can be selected and optimized based on process characteristics of specific installations. For example, cross-sectional shape 140 can be selected based on variables including flow rates, residence times, organic loading and organic type in the influent process water, flow direction, number of distinct flow streams, desired flow mixing and the like. Representative cross-sectional shapes 140 can comprise a semi-circular or hemispherical section 140a, a quadrilateral, for example, a rectangular or square section 140b, a circular section 140c, a triangular section 140d, a trapezoidal section 140e, a hexagonal shape 140f and combinations thereof. As seen in FIGS. 7A-7F, each of the illustrated cross-sectional shapes 140 can include a flow interface 142 allowing for multiple flow species to flow through the upper drain portion 122. Flow interface 142 can define distinct flow channels within the upper drain portion 122 and can further comprise utilize flow orifices and similar flow control features to allow different flow species to mix within the upper drain portion 122 as desired by process requirements.

Figures 8A, 8B:
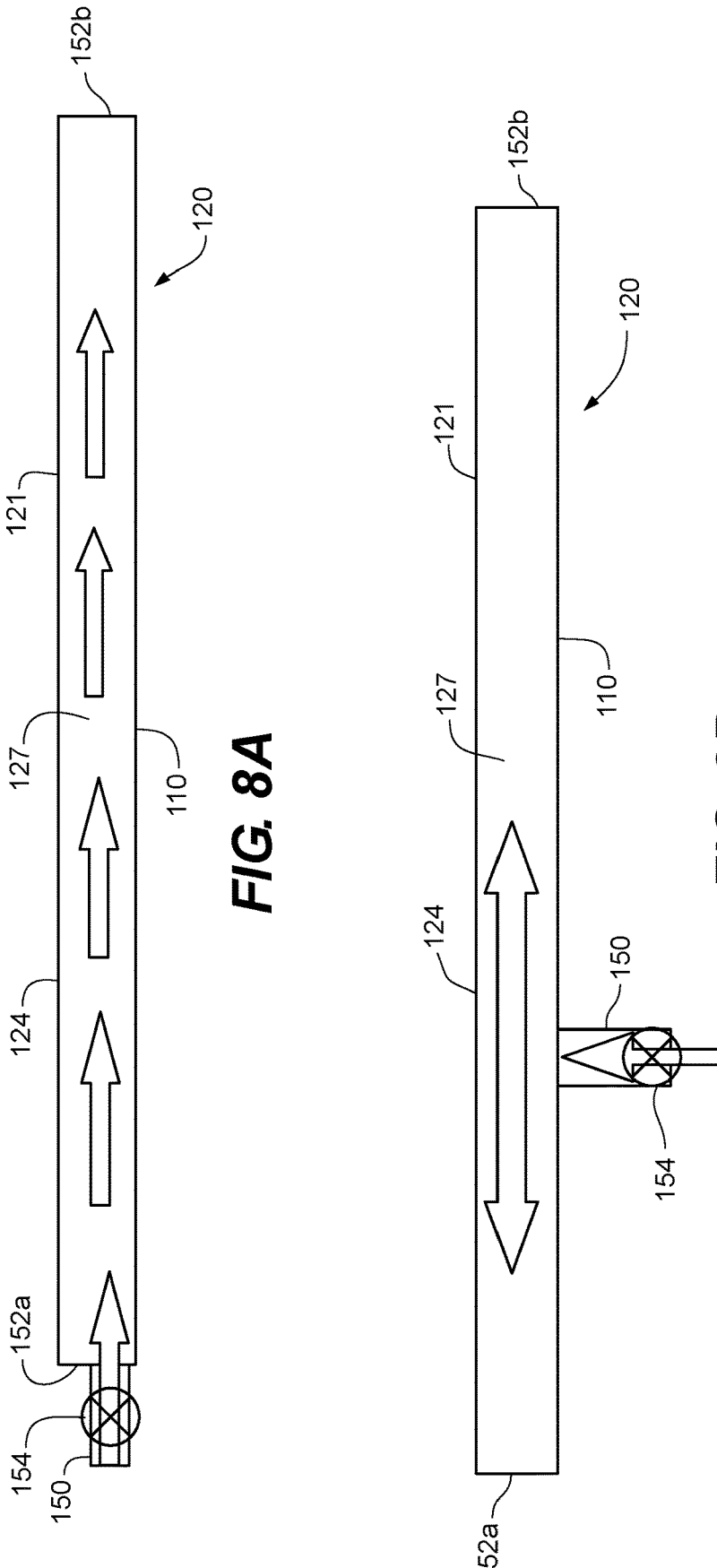
FIG. 8A is a schematic side view of a shaped underdrain according to an embodiment of the present invention.
FIG. 8B is a schematic side view of a shaped underdrain according to an embodiment of the present invention.
Figure 9A:
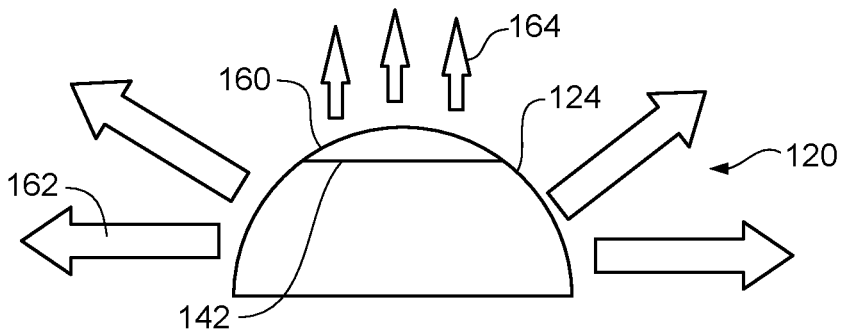
FIG. 9A is a schematic end view of a shaped underdrain according to an embodiment of the present invention.
Figure 9B:
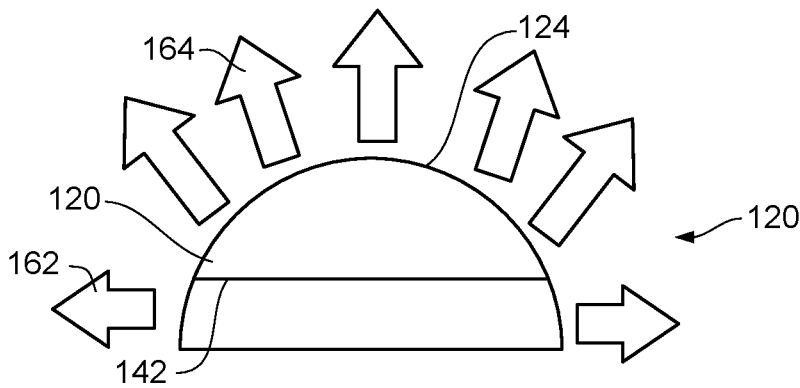
FIG. 9B is a schematic end view of a shaped underdrain according to an embodiment of the present invention.
Figure 9C:
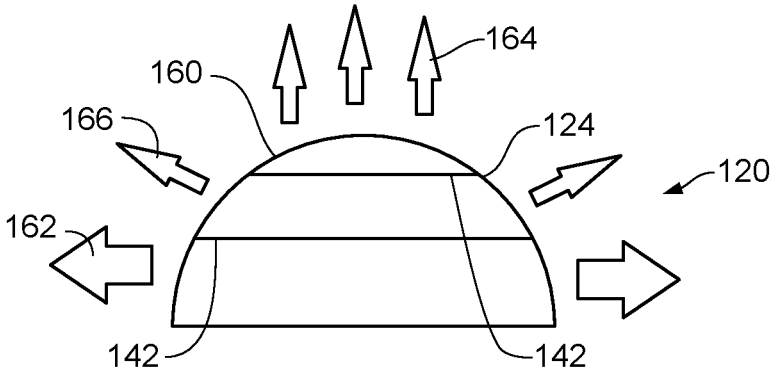
FIG. 9C is a schematic end view of a shaped underdrain according to an embodiment of the present invention.
Figure 10:
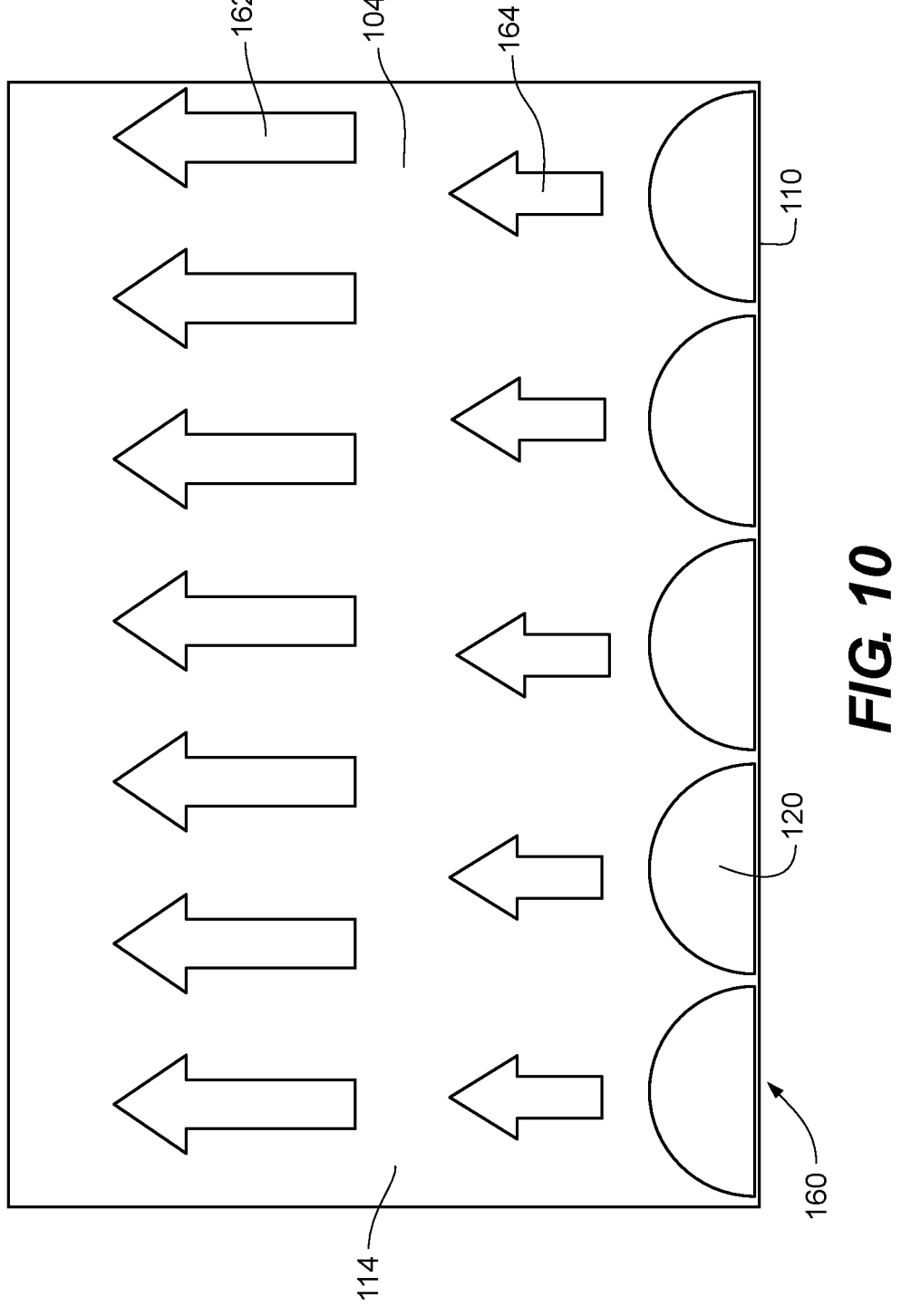
FIG. 10 is a schematic view of a biofilter system according to an embodiment of the present invention.
Figure 11A:
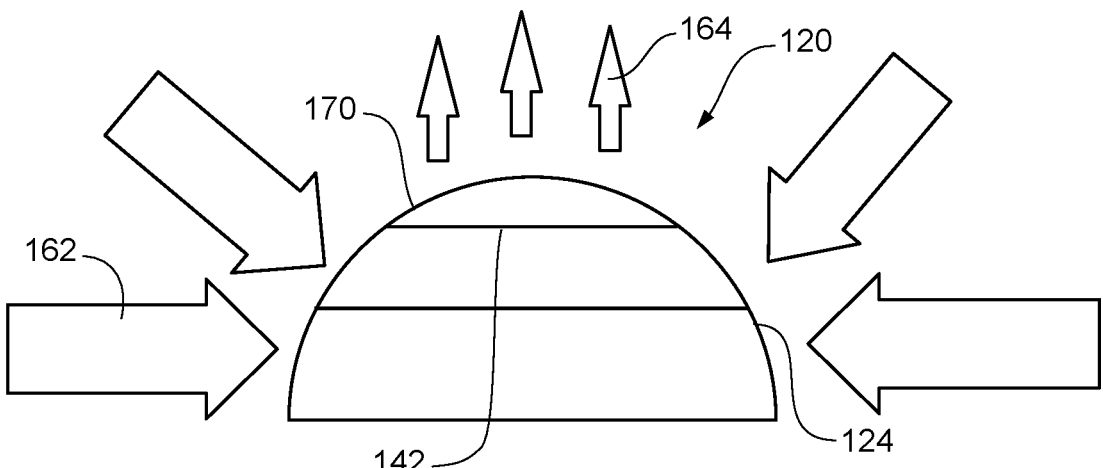
FIG. 11A is a schematic end view of a shaped underdrain according to an embodiment of the present invention.
Figure 11B:
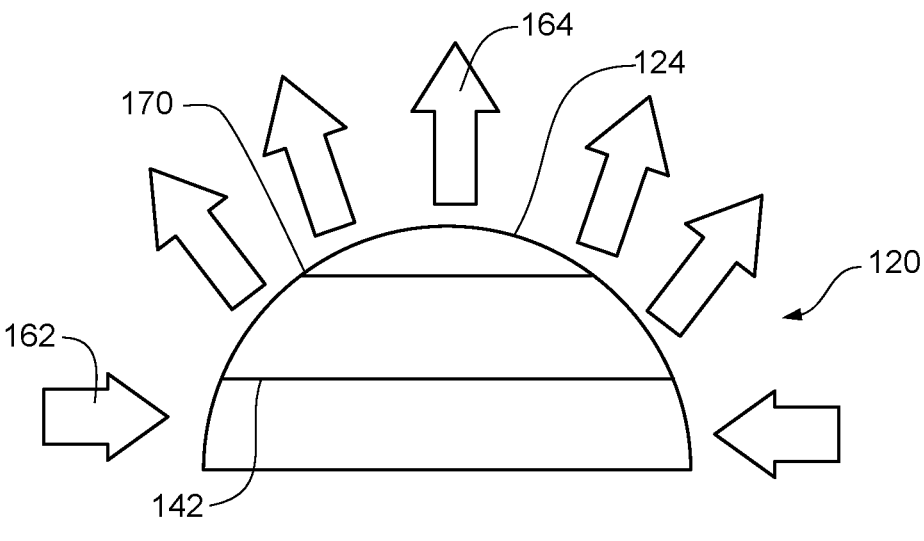
FIG. 11B is a schematic end view of a shaped underdrain according to an embodiment of the present invention.
Figure 11C:
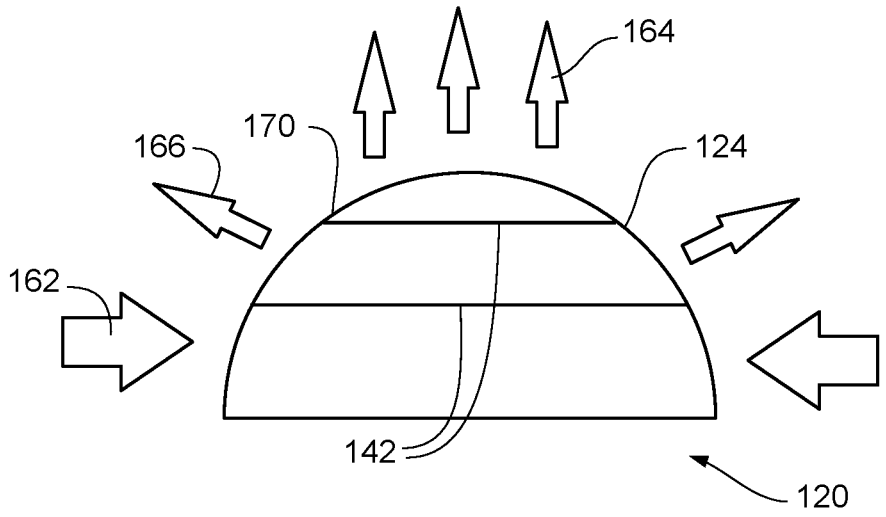
FIG. 11C is a schematic end view of a shaped underdrain according to an embodiment of the present invention.
Figure 12:
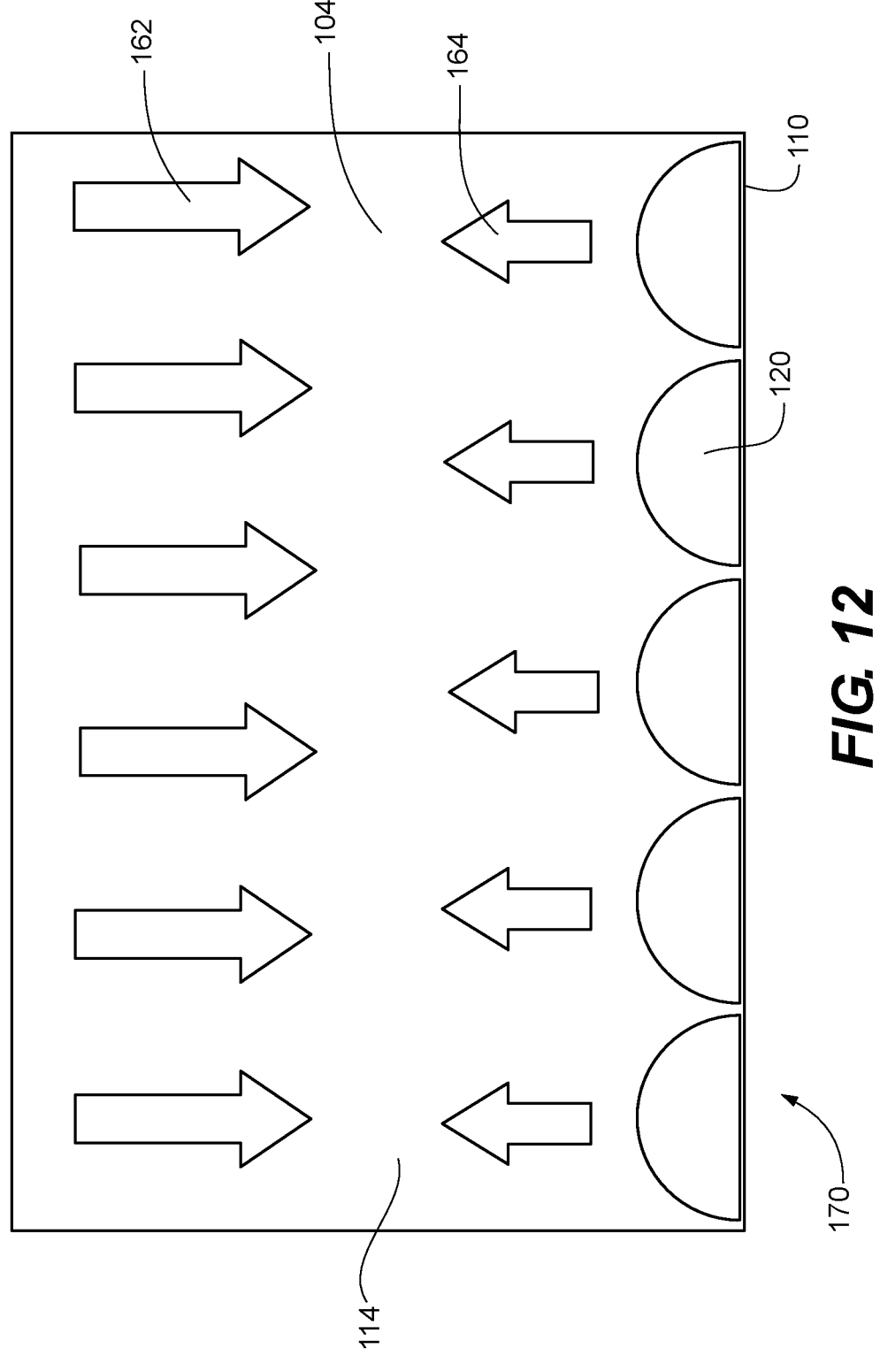
FIG. 12 is a schematic view of a biofilter system according to an embodiment of the present invention.
Figure 13A:
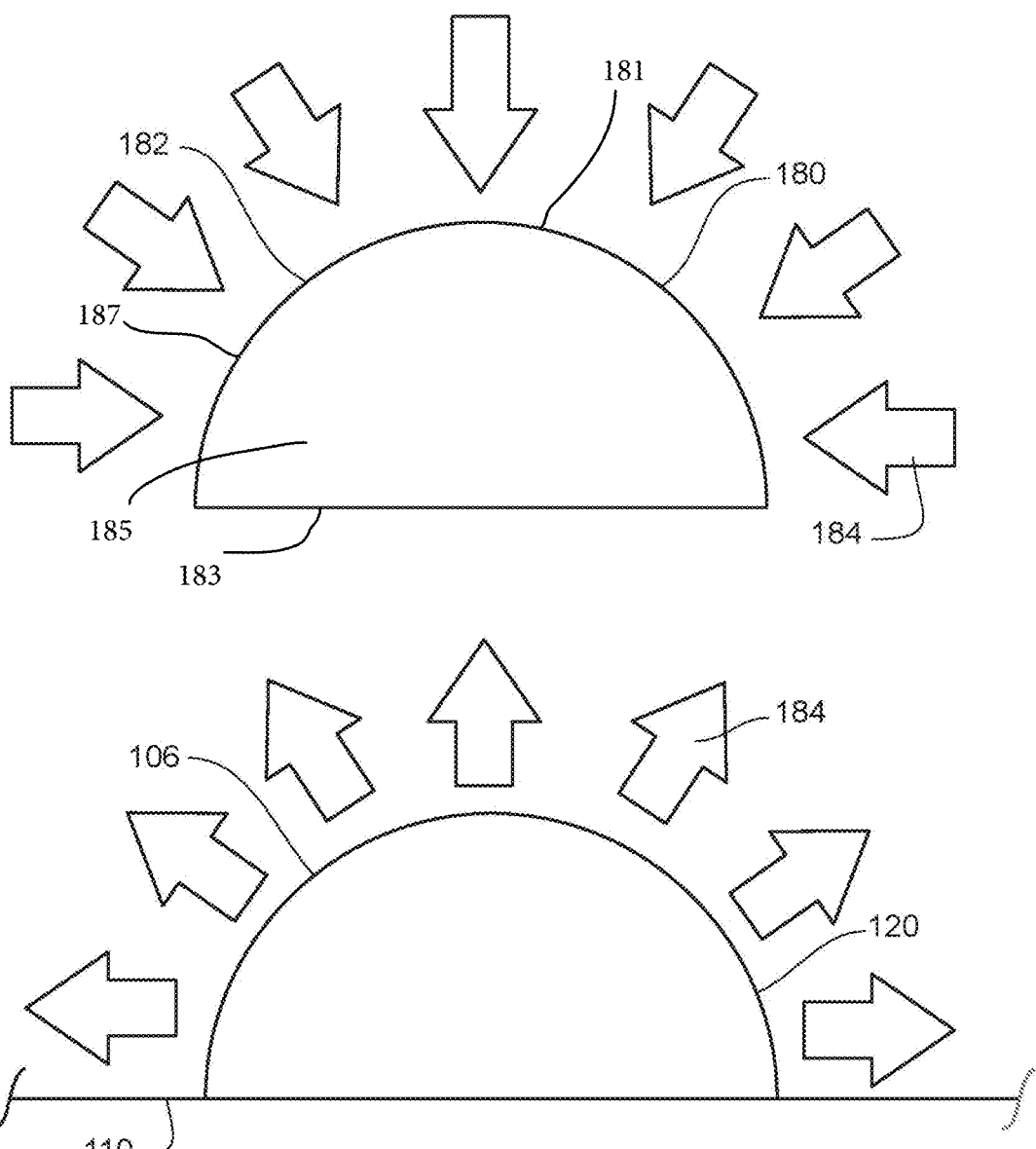
FIG. 13A is a schematic end view of a shaped underdrain and an upper shaped underdrain assembly according to an embodiment of the present invention.
Figure 13B:
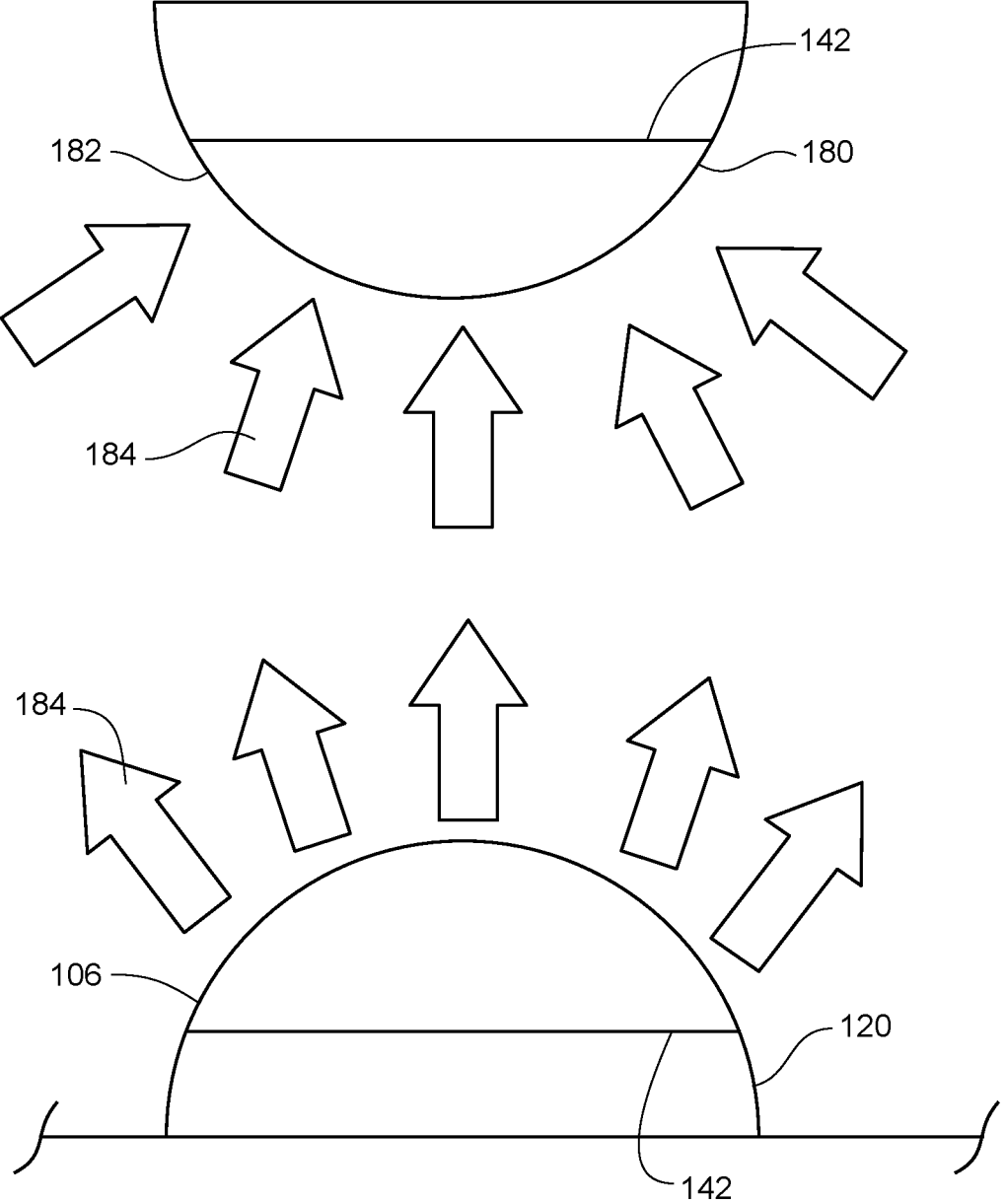
FIG. 13B is a schematic end view of a shaped underdrain an upper shaped underdrain assembly according to an embodiment of the present invention.

As illustrated in FIGS. 8A and 8B, the shaped underdrains 120 can include one or more fluid connections 150 at one or more ends 152a, 152b of the elongated structure 121, in the floor 110 and/or in the upper support surface 124. Fluid connections 120 can allow for inflow and outflow of various liquid and gas flow streams and species including, for example, a process influent stream, a process effluent stream, an aeration inflow stream, an aeration outflow stream, a process additive inflow stream and combinations thereof. The fluid connections 120 can include a flow control mechanism 154, for example, flow orifices, flow control valves and the like to control flow characteristics into and out of the shaped underdrains 120 to maintain desirable interface conditions within the shaped underdrains 120 and the tank 102.

As seen in FIGS. 9A, 9B, 9C and 10, the shaped underdrain 120 can be configured with flow interfaces 142 such that the process flow streams, for example, two or more of the process influent streams, the process effluent stream, the aeration inflow stream, the aeration outflow stream, the process additive inflow stream and any other flow stream appropriate for encouraging biological treatment in the tank 102 can interact with the shaped underdrain 120 in a single flow direction. For example, shaped underdrain 120 can include single direction flow designs 160 in which a high flow species 162 and a low flow species 164 can be directed through the upper support surface 124 to optimize process conditions within tank 102. In addition, additional flow streams, for example, a third flow species 166 can be directed through the permeable upper support surface 124 through the use of internal flow controls, for example, orifices or flow control valves, to promote stratified flow through the shaped underdrain 120.

Alternatively, the shaped underdrain 120 can be configured with flow interfaces 142 such that process flow streams, for example, two or more of the process influent stream, the process effluent stream, the aeration inflow stream, the aeration outflow stream, the process additive inflow stream and any other flow stream appropriate for encouraging biological treatment in the tank 102 can interact with the shaped underdrain. 120 in dual flow directions as shown in FIGS. 11A, 11B, 11C and 12. For example, shaped underdrain 120 can include dual flow designs 170 in which the high flow species 162 and the low flow species 164 can be directed through the upper support surface 124 in opposite flow directions to optimize process conditions within tank 102. In addition, additional flow streams, for example, the third flow species 1166 can be directed through the upper support surface 124 in the same or different direction as high flow species 162 and low flow species 164.

Figure 14A:
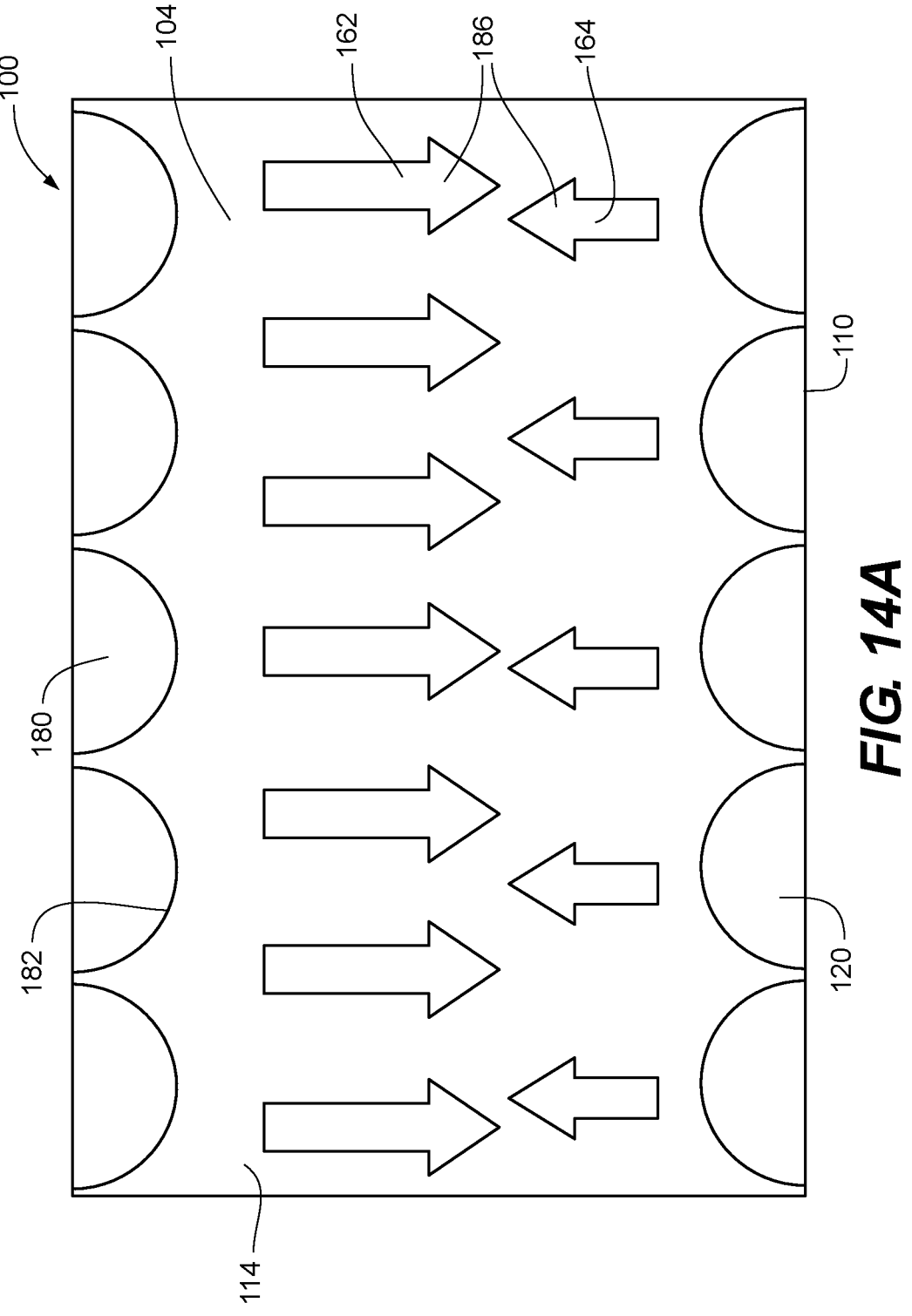
FIG. 14A is a schematic view of a biofilter system according to an embodiment of the present invention.
Figure 14B:
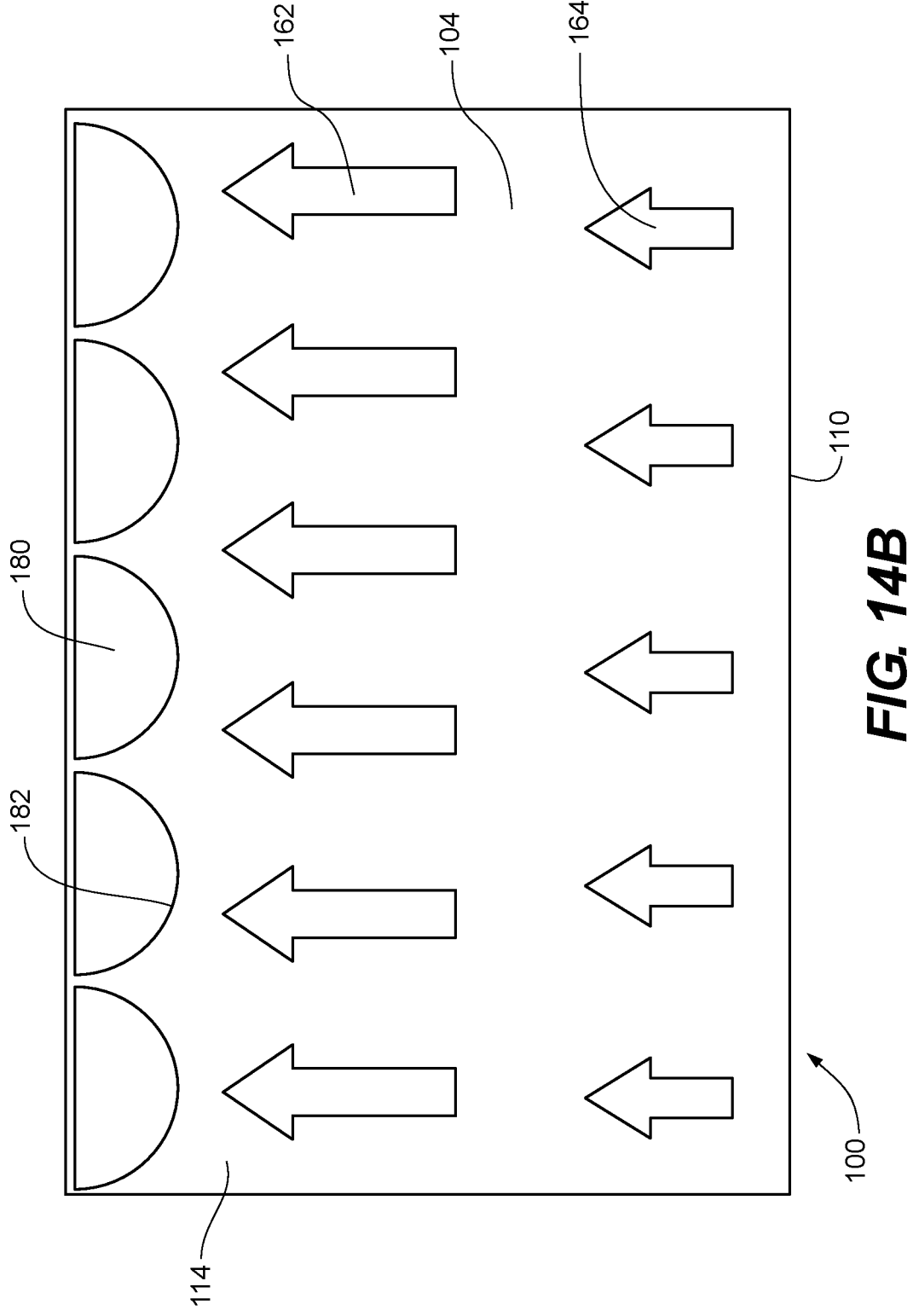
FIG. 14B is a schematic view of a biofilter system according to an embodiment of the present invention.
Figure 15A:
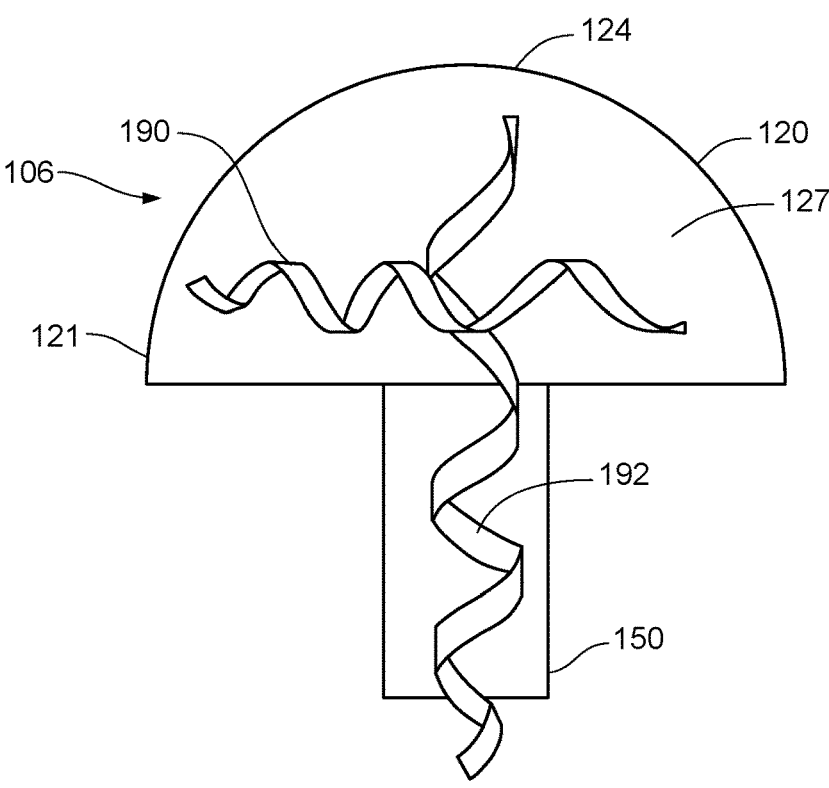
FIG. 15A is a schematic view of an underdrain assembly for mixing multiple flow species according to an embodiment of the present invention.
Figure 15B:
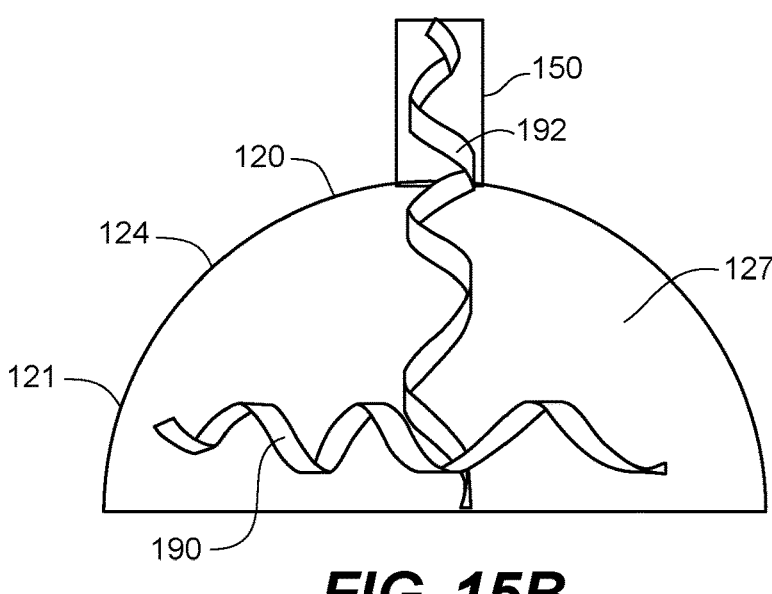
FIG. 15B is a schematic view of an underdrain assembly for mixing multiple flow species according to an embodiment of the present invention.
Figure 15C:
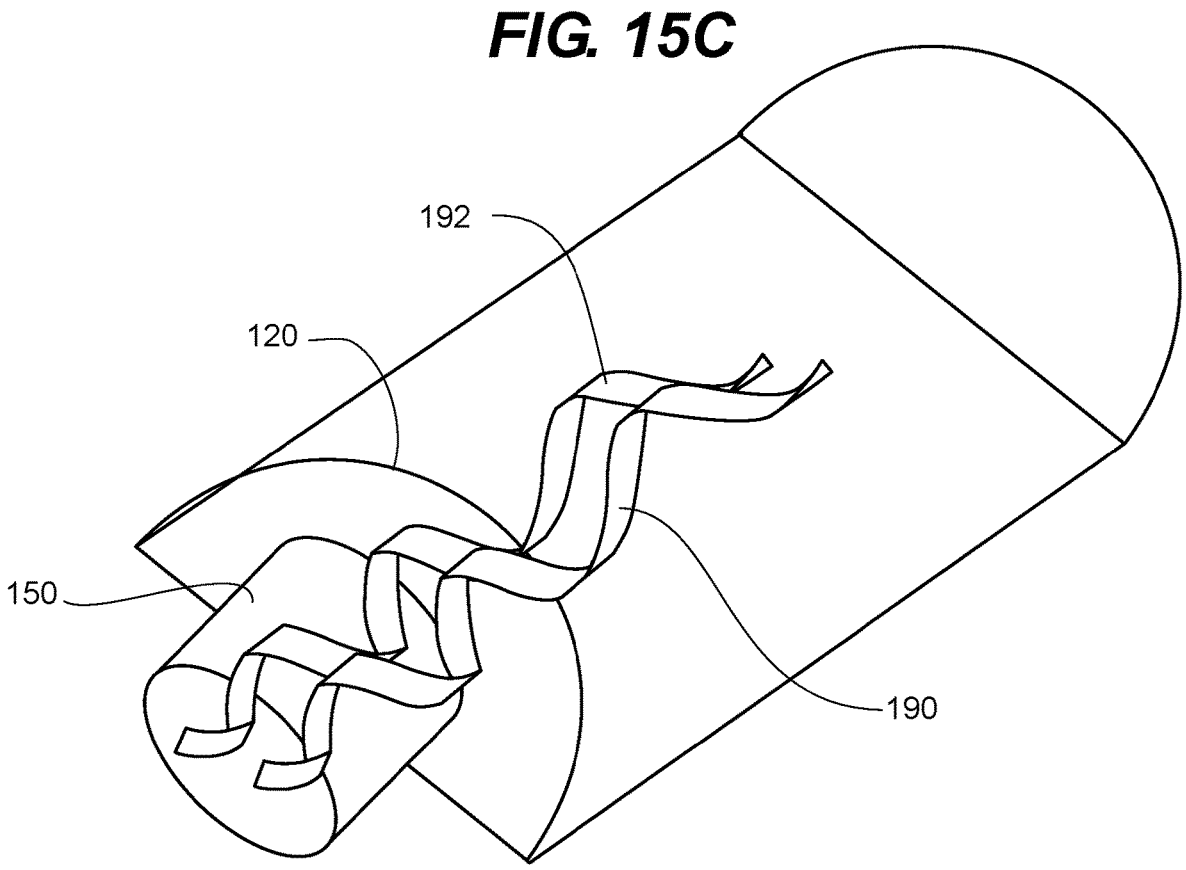
FIG. 15C is a schematic view of an underdrain assembly for mixing multiple flow species according to an embodiment of the present invention.
Figure 15D:
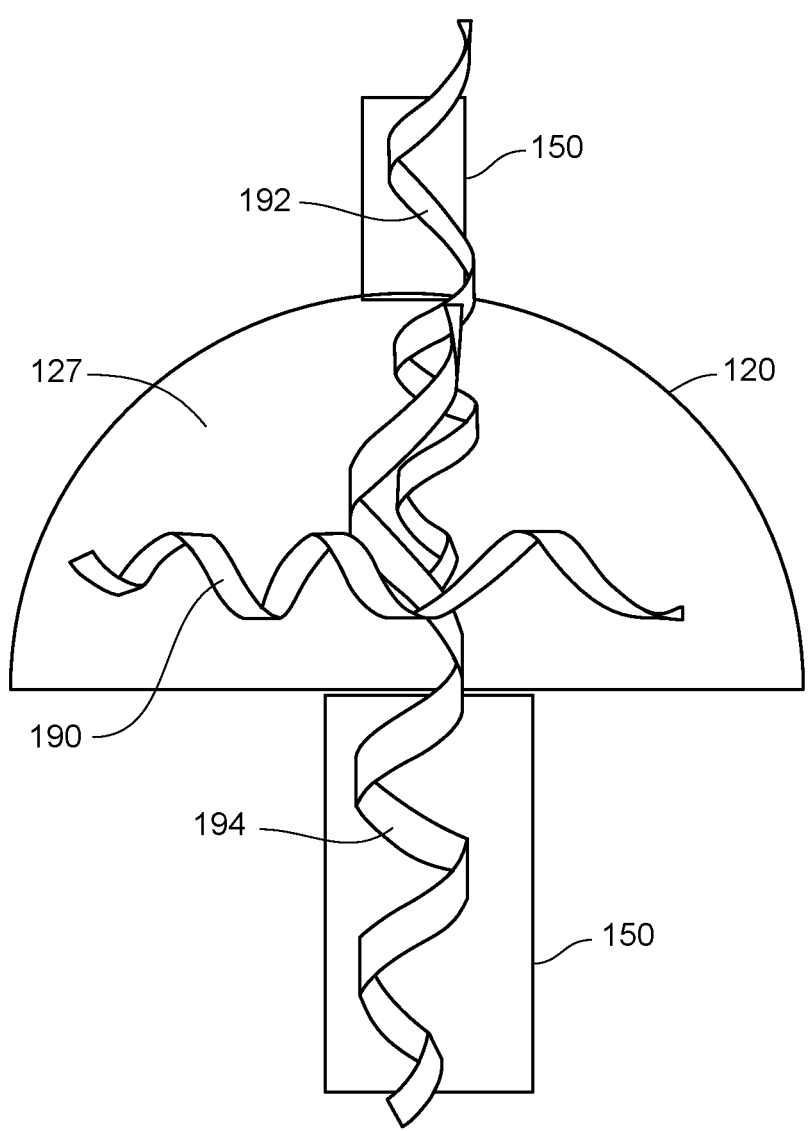
FIG. 15D is a schematic view of an underdrain assembly for mixing multiple flow species according to an embodiment of the present invention.
Figures 15E, 15F:
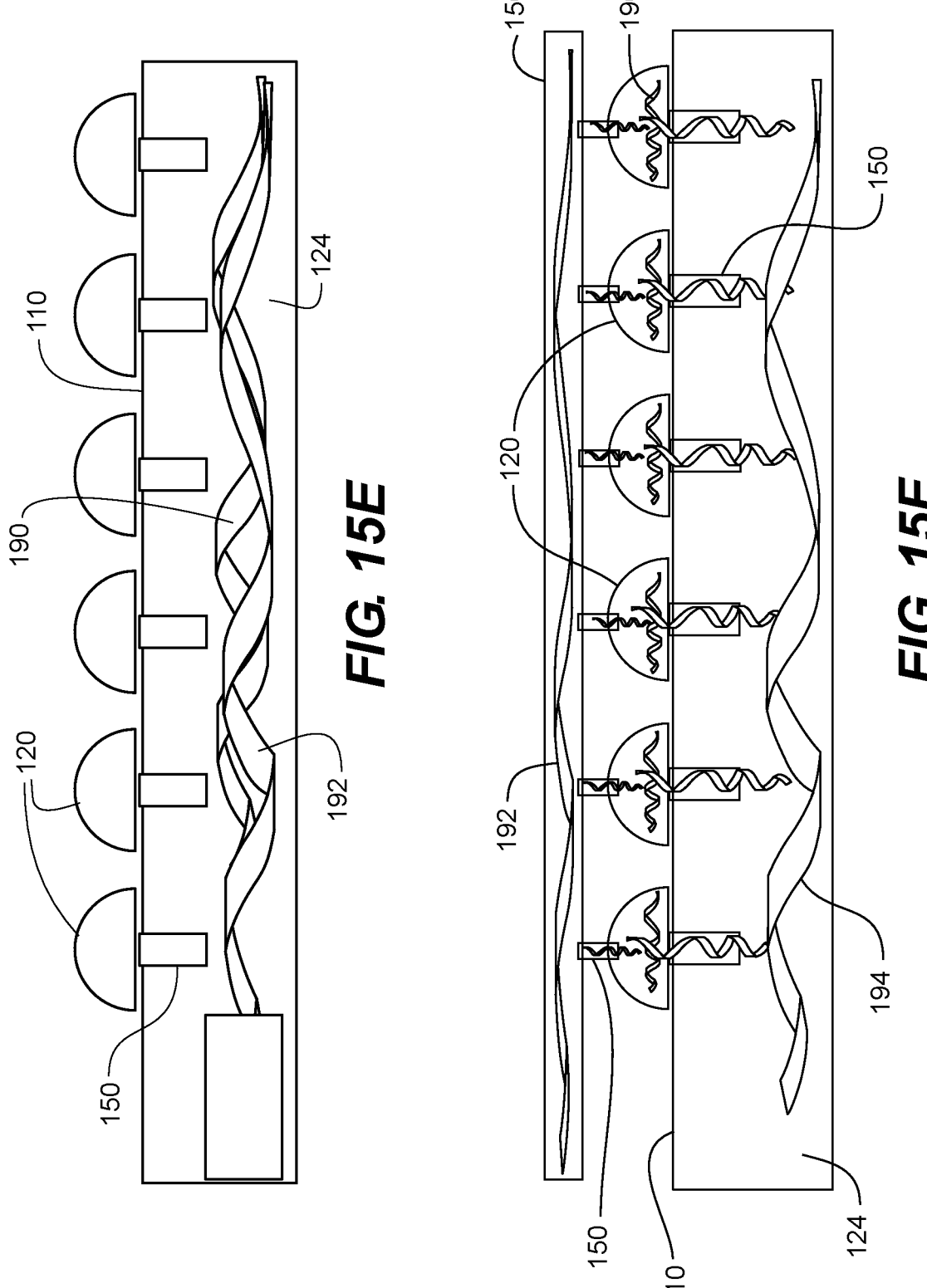
FIG. 15E is a schematic view of an underdrain assembly for mixing multiple flow species according to an embodiment of the present invention.
FIG. 15F is a schematic view of an underdrain assembly for mixing multiple flow species according to an embodiment of the present invention.

In another alternative arrangement shown in FIGS. 13A, 13B, 14A and 14B, biofilter system 100 can comprise an upper shaped drain assembly 180 that can be mounted in tank 102 above floor 110. In some embodiments, the upper shaped drain assembly 180 can reside above the previously described underdrain assembly 106. In some embodiments, the upper shaped drain assembly 180 can be mounted above or within the media bed 104 in order to provide advantageous biological conditions for the treatment media 112. Generally, the upper shaped drain assembly 180 can comprise a plurality of upper shaped drains 182. Upper shaped drains 182 can substantially resemble the construction and arrangement of shaped underdrains 120, including a permeable upper drain surface 181, an upper drain lower surface 183 and an upper drain interior 185 defining an upper drain cross-section 187, with the exception of their physical location relative to floor 110. As illustrated, upper shaped drains 182 can be configured such that process flow streams, for example, two or more of the process influent stream, the process effluent stream, the aeration inflow stream, the aeration outflow stream, the process additive inflow stream and any other flow stream appropriate for encouraging biological treatment in the tank. 102 can interact with the upper shaped drain 182 in a single flow direction. For example, upper shaped underdrain 182 can include a single flow design 184 in which the high flow species 162 and the low flow species 164 can be directed in the same flow direction to optimize process conditions within tank 102. Alternatively, the shaped underdrain 120 and the upper shaped underdrain 182 can each include a single but opposite flow design 186 in which the high flow species 162 and the low flow species 164 flow in opposite directions between the shaped underdrain 120 and the upper shaped underdrain 182 to optimize process conditions within tank 102. Finally, some embodiments of biofilter system 100 can replace the underdrain assembly 106 with the upper shaped drain assembly 180 as shown in FIG. 14B.

Finally, the underdrain assembly 106 can be utilized to induce mixing of two or more flow stream species within the shaped underdrain 120 prior to said flow stream species being introduced to the media bed 104. With reference to FIGS. 15A, 15B, 15C, 15D, 15E and 15F, mixing of a first flow species 190, a second flow species 192, a third flow species 194 and additional flow species can be accomplished internally within one or both of the upper drain portion 122 and flume plate 123 prior to directing a mixed flow stream through the permeable upper support surface 124 and into the treatment media 112. By mixing the various flow species prior to introduction to the media bed 104, the full depth of the media bed 104 is available for biological interaction.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. A biofilter system, comprising:
   a tank defining a floor surface;
   a media bed;
   one or more flow channels defined below the floor surface;
   a shaped underdrain assembly including a plurality of elongated underdrain structures positioned on the tank floor, each elongated underdrain structure having a flume plate residing within the one or more flow channels, each elongated underdrain structure having a permeable upper surface, a lower surface in fluid communication with the flume plate and an underdrain interior so as to define an underdrain cross-section and wherein the permeable upper surface supports the media bed; and
   an upper shaped drain assembly including a plurality of elongated upper drain structures positioned above the shaped underdrain assembly, the upper drain structures having a permeable upper drain surface, an upper drain lower surface and an upper drain interior defining an upper drain cross-section, wherein the permeable upper drain surface comprises a slotted screen.

2. The biofilter system of claim 1, wherein a flow interface is mounted within the underdrain interior, the flow interface allowing at least a first and second flow species to flow through the permeable upper surface.

3. The biofilter system of claim 2, wherein the flow interface includes one or more of a flow orifice or a flow valve.

4. The biofilter system of claim 2, wherein the at least first and second flow species include one or more of a process influent stream, a process effluent stream, an aeration inflow stream, an aeration outflow stream and/or a process additive inflow stream.

5. The biofilter system of claim 1, wherein the permeable upper drain surface is positioned to face the permeable upper surface of each elongated underdrain structure.

6. The biofilter system of claim 1, wherein the permeable upper drain surface is positioned to face away from the permeable upper surface of each elongated underdrain structure.

7. The biofilter system of claim 1, wherein the upper shaped drain assembly is positioned within the media bed.

8. The biofilter system of claim 1, wherein the upper shaped drain assembly is positioned above the media bed.

9. The biofilter system of claim 1, wherein the permeable upper surface comprises a slotted screen.

10. The biofilter system of claim 1, wherein the underdrain cross-section comprises a semi-circular section.

11. The biofilter system of claim 1, wherein the underdrain cross-section comprises a rectangular or square cross-section.

12. The biofilter system of claim 1, wherein the underdrain cross-section comprises a triangular cross-section.

13. The biofilter system of claim 1, wherein the underdrain cross-section comprises a hexagonal cross-section.

14. The biofilter system of claim 1, wherein the permeable upper surface comprises a surface coating selected to inhibit biological growth on the permeable upper surface.

15. The biofilter system of claim 1, wherein the at least first and second flow species include a high flow species and a low flow species that are directed through the permeable upper surface in a shared direction.

16. The biofilter system of claim 1, wherein a high flow species and a low flow species are directed through the permeable upper surface in opposed directions.

17. A method for promoting biological treatment in a biofilter, comprising:

positioning a shaped underdrain assembly in a floor of a biofilter tank, the floor defining one or more flow channels and wherein the shaped underdrain assembly includes a plurality of elongated underdrain structures, each elongated underdrain structure having a flume plate residing within the one or more flow channels, each elongated underdrain structure further including a permeable upper surface, a lower surface and an underdrain interior so as to define an underdrain cross-section, and wherein each lower surface is in fluid communication with at least one of the flow channels through the flume plate;

supporting a media bed on the permeable upper surface of each elongated underdrain structure;

positioning an upper shaped drain assembly in the biofilter tank, the upper shaped drain assembly located above the shaped underdrain assembly, the upper shaped drain assembly including a plurality of elongated upper drain structures, each elongated upper drain structure including an upper drain permeable surface, an upper drain lower surface and an upper drain interior defining an upper drain cross-section, wherein the upper drain permeable surface comprises a slotted screen; and directing a fluid flow through the permeable upper surface to promote biological interaction in the media bed.

18. The method of claim 17, wherein the step of directing the fluid flow through the permeable upper surface comprises:

mixing a first flow species and a second flow species within the underdrain interior prior to directing a mixed flow stream through the permeable upper surface and into the media bed.

19. The method of claim 17, wherein the upper drain permeable surface is positioned to face the permeable upper surface of each elongated underdrain structure.

20. The method of claim 17, wherein the upper drain permeable surface is positioned to face away from the permeable upper surface of each elongated underdrain structure.

21. The method of claim 6, wherein the step of positioning the upper shaped drain assembly further comprises:

positioning the upper shaped drain assembly above the media bed.

22. The method of claim 17, wherein the step of positioning the upper shaped drain assembly further comprises:

positioning the upper shaped drain assembly within the media bed.

* * * * *